H. S. LUBBEN.
ATTACHMENT FOR CORN PLANTERS.
APPLICATION FILED OCT. 16, 1913.
1,091,068.
Patented Mar. 24, 1914.
3 SHEETS—SHEET 1.
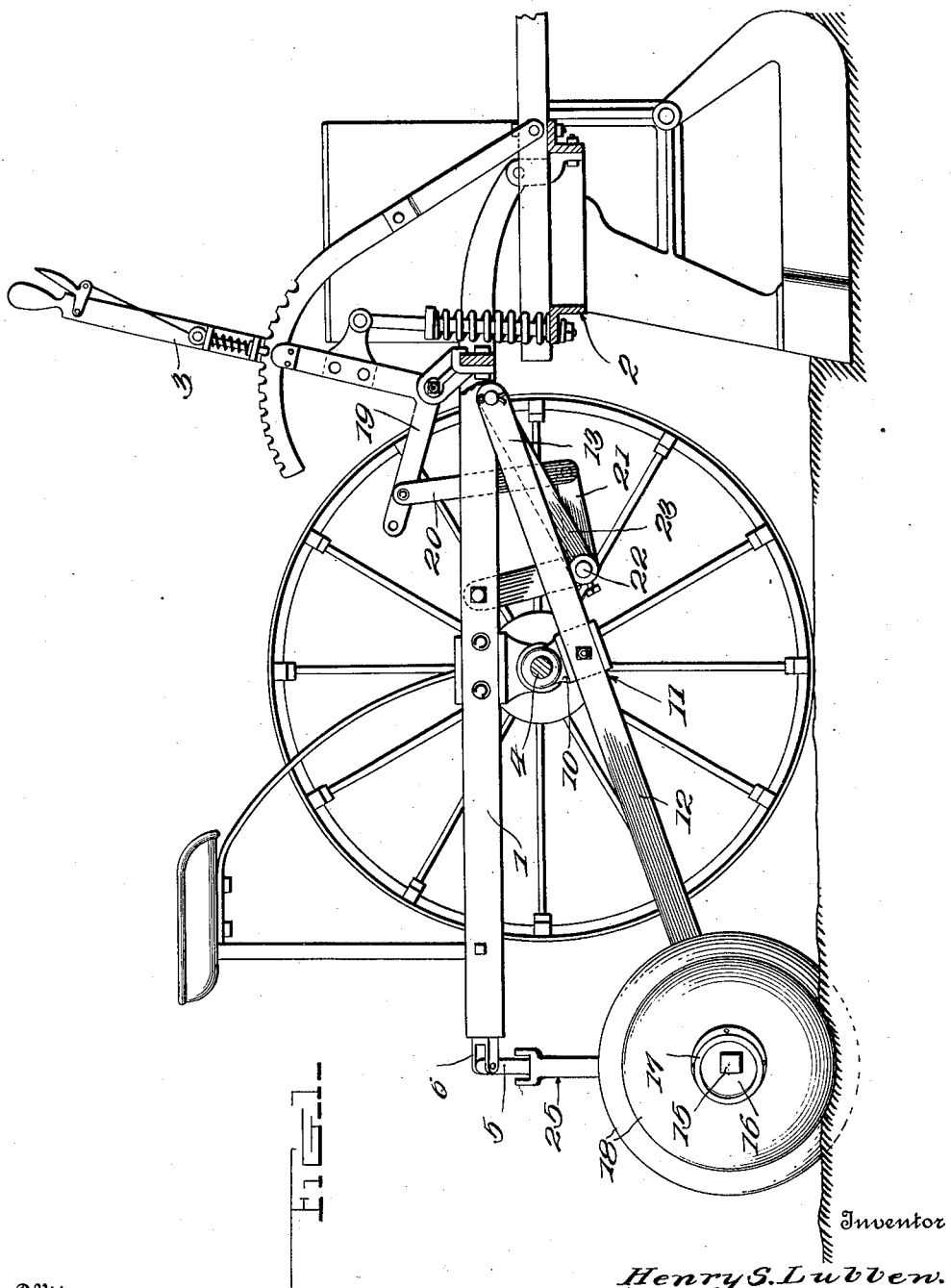
Witnesses
J. R. Pierce
C. Munker
Inventor
Henry S. Lubben.
By H. B. Willson & Co.
Attorneys
COLUMBIA PLANOGRAPH CO., WASHINGTON, D. C.

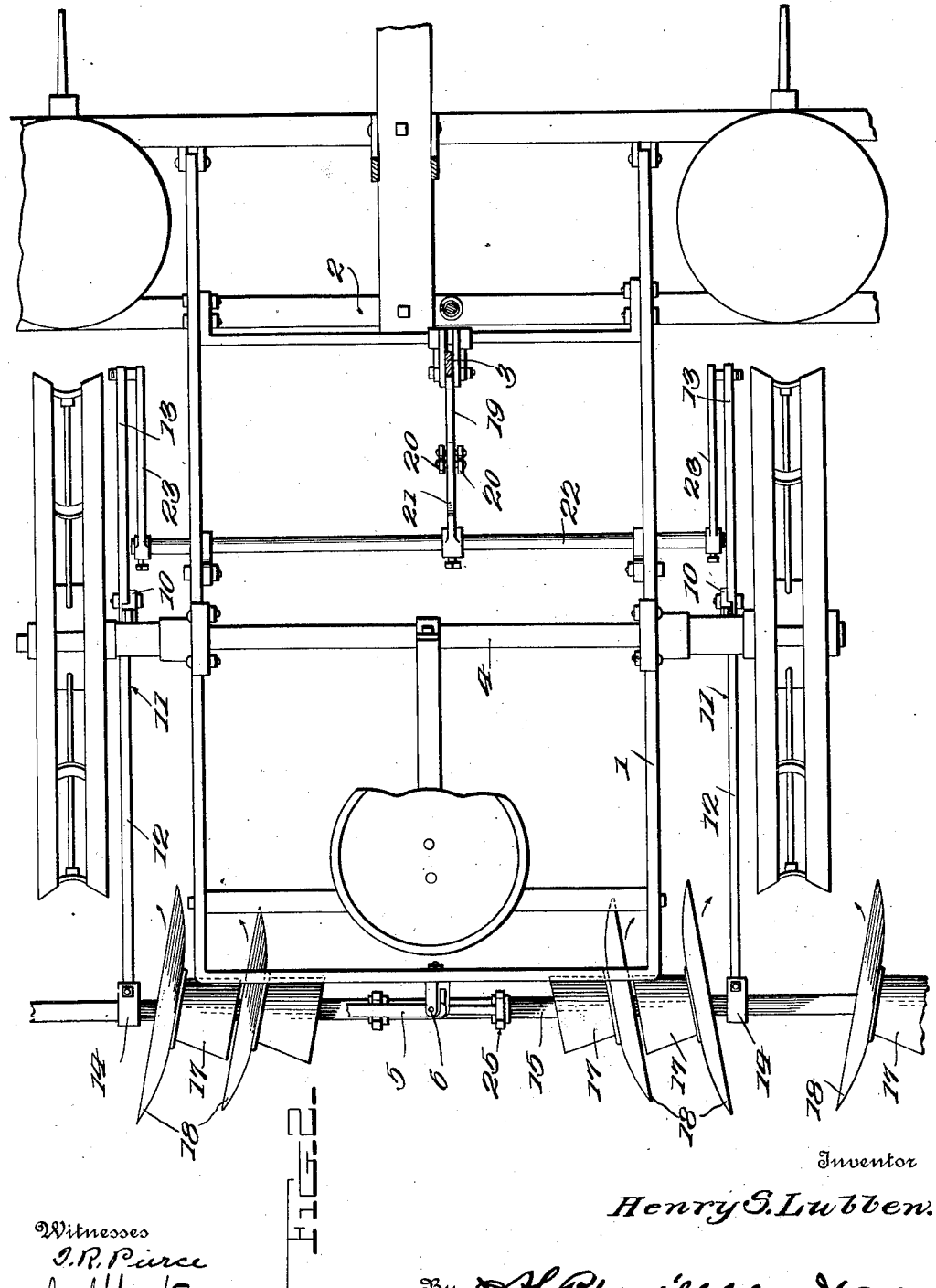

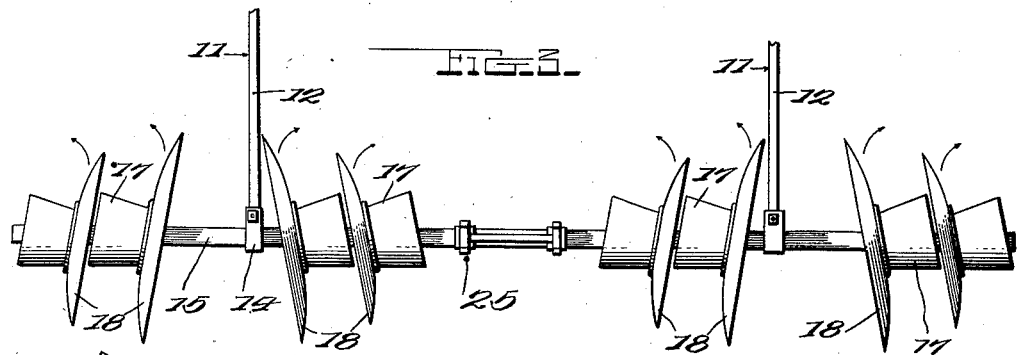
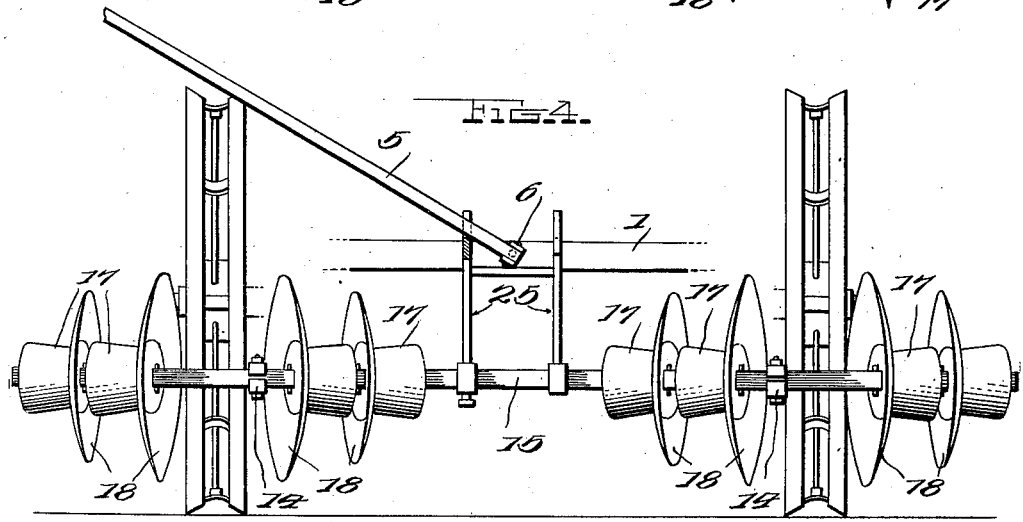
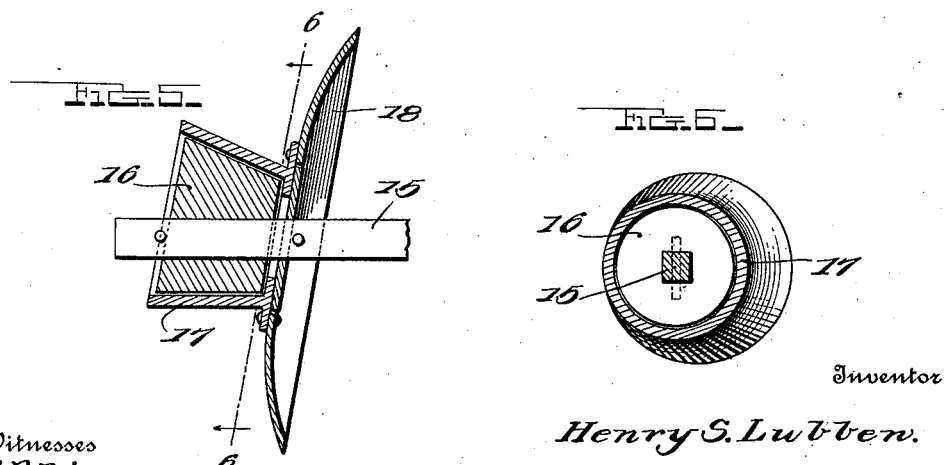

UNITED STATES PATENT OFFICE.

HENRY S. LUBBEN, OF LE MARS, IOWA.

ATTACHMENT FOR CORN-PLANTERS.

1,091,068.     Specification of Letters Patent.     Patented Mar. 24, 1914.

Application filed October 16, 1913. Serial No. 795,520.

*To all whom it may concern:*

Be it known that I, HENRY S. LUBBEN, a citizen of the United States, residing at Le Mars, in the county of Plymouth and State of Iowa, have invented certain new and useful Improvements in Attachments for Corn-Planters; and I do declare the following to be a full, clear, and exact description of the invention, such as will enable others skilled in the art to which it appertains to make and use the same.

This invention relates to improvements in corn planters and more particularly to supplemental coverers therefor.

The primary object of the invention is to provide a device of this character which will effectually cover the seed dropped by the seed hoppers and will, at the same time, loosen the soil along the rows of seed so dropped.

A secondary object is to provide means whereby, if desired, some of the soil may be thrown away from the rows, thus allowing the soil covering the seed to dry out to a certain extent. This is particularly advantageous in a wet season when the seed is liable to mold on account of the dampness of the earth.

Still another object is to provide means for raising the device out of engagement with the earth simultaneously with the raising of the planter shoes, and at the same time, raising the ordinary marker secured to the rear of the planter frame.

With these objects in view, the invention resides in certain novel features of construction, described and claimed herein, and shown in the drawings, wherein:

Figure 1 is a side view of an ordinary corn planter showing my invention applied thereto. Fig. 2 is a plan view of the same showing the covering disks in one position. Fig. 3 is a similar view of a portion of the planter frame showing the disks reversed. Fig. 4 is a rear view showing the manner in which the marker rod is raised. Fig. 5 is a detail sectional view of one of the disks and a portion of the shaft, and Fig. 6 is a similar view taken on line 6—6 of Fig. 5.

In the accompanying drawings, the numeral 1 designates the frame of an ordinary corn planter, 2 the hopper frame, 3 the lever for raising and lowering said frame, 4 the axle, 5 the marker rod, and 6 the pivot therefor. All of these features are of common construction, and require no elaboration.

Coming now to the details of the present invention, the numerals 10 designate hangers having a pivotal engagement with the axle 4 of the planter. Secured to each hanger is a draw bar 11 having a rearwardly extending portion 12 and a forwardly extending portion 13. The rear ends 12 of each bar carry a clamp 14 adapted to rigidly, yet adjustably, secure a square shaft 15 adjacent each of its ends. Arranged at suitable intervals on said shaft 15 are bearing cones 16, the axial line of which stands at an angle to that of the shaft 15. Revolubly mounted on these cones are the hollow hubs 17 of the covering disks 18. These disks are so arranged on the shaft that by setting them as seen in Fig. 2 they will pull the soil over the row of seed dropped, or by reversing this position, as shown in Fig. 3, they may be made to push some of it away from said row. As these disks are only in operation when seed is being dropped by the hoppers, I provide the following means for raising them simultaneously with the raising of the seed shoes.

The hopper frame operating lever 3, before referred to, is provided with a rearward extension 19 to the end of which are pivoted links 20. The lower ends of the links 20 are pivoted to an arm 21 rigidly secured to a rock-shaft 22, journaled in suitable bearings on the frame 1. Each end of said rock shaft carries a rigid arm 23 which is pivoted to the forward end 13 of the draw bars 11. Thus it will be seen that when the lever 3 is pulled rearwardly to raise the shoes out of the earth, the shaft 22 will rock forwardly, thus causing its arms 23 to force downwardly on the ends 13 of the bars 11. Said bars 11, then rock with their hangers 10 around the axle 4, and in so doing, their rear ends rise and carry the disk shaft 15 and the disks 18, thus raising said disks out of contact with the ground. In order that the marker 5 may be raised at the same time, I provide the shaft 15 with a bracket 25 which is adapted to contact with the lower side of said rod 5 and thus raise the same.

From the foregoing description, taken in connection with the accompanying drawings, the construction and operation of the device will be readily understood without requiring a more extended explanation.

Various changes in the form, proportion, and minor details may be resorted to without departing from the spirit of the invention as claimed.

What I claim is:—

1. The combination with a planter comprising a main frame, a supporting axle, seed shoes carried by said main frame, a marking rod carried by said frame and a lever for raising and lowering said seed shoes, of a supplemental covering implement, connections to said lever whereby said implement may be raised or lowered simultaneously with the raising and lowering of said seed shoes, and a bracket carried by said supplemental implement for raising or lowering said marking rod simultaneously with the raising or lowering of said seed shoes and covering implement.

2. The combination with a planter comprising a main frame, a supporting axle, seed shoes carried by said main frame, and a lever for raising and lowering said seed shoes, of a plurality of draw bars pivotally carried by said axle, a shaft carried by the rear ends of said draw-bars, disks carried by said shaft, a rock shaft having rigid arms pivoted to said draw-bars, and an arm connected by a link to said lever.

In testimony whereof I have hereunto set my hand in presence of two subscribing witnesses.

HENRY S. LUBBEN.

Witnesses:
 HERMAN PRUST,
 T. M. ZINK.

Copies of this patent may be obtained for five cents each, by addressing the "Commissioner of Patents, Washington, D. C."